United States Patent [19]

Bilgeri

[11] Patent Number: 5,063,853
[45] Date of Patent: Nov. 12, 1991

[54] CARTRIDGE CASE

[75] Inventor: Elmar Bilgeri, Steyr, Austria

[73] Assignee: Steyr-Daimler-Puch AG, Vienna, Austria

[21] Appl. No.: 657,635

[22] Filed: Feb. 19, 1991

[30] Foreign Application Priority Data

Feb. 27, 1990 [AT] Austria .................................. 452/90

[51] Int. Cl.$^5$ .............................................. F42B 5/30
[52] U.S. Cl. .................................. 102/467; 102/444; 102/469
[58] Field of Search ............... 102/430, 444, 464, 466, 102/467, 469, 470, 472

[56] References Cited

U.S. PATENT DOCUMENTS

| 2,918,868 | 12/1959 | Ringdal | 102/466 |
| 3,144,827 | 8/1964 | Boutwell | 102/466 |
| 4,726,296 | 2/1988 | Leshner et al. | |
| 4,809,612 | 3/1989 | Ballreich et al. | 102/466 |

FOREIGN PATENT DOCUMENTS

| 164502 | 8/1955 | Australia. | |
| 350942 | 6/1979 | Austria. | |
| 157170 | 12/1956 | Sweden | 102/430 |

Primary Examiner—Harold J. Tudor
Attorney, Agent, or Firm—Marmorek, Guttman & Rubenstein

[57] ABSTRACT

A cartridge case comprises a metal base piece, a plastic sleeve casing, and a plastic tubular section made as a separate part extending along the inside surface of the sleeve casing. The tubular section includes a flange which extends along and is in intimate contact with an inner face of the base piece. A snap lock design locks the sleeve casing, the base piece and the tubular section together. When the cartridge case includes a flash tube fitted onto the base piece, the tubular section also includes a lip extending from the flange and in intimate contact with the outer surface of the flash tube.

3 Claims, 1 Drawing Sheet

CARTRIDGE CASE

BACKGROUND OF THE INVENTION

The instant invention relates to a cartridge case having a metal base and a sleeve casing made from a synthetic plastic material connected to the metal base by a snap lock, wherein a tubular section extends from the base piece into the combustion chamber of the cartridge case along the inside surface of the sleeve casing.

In a known cartridge case of this type (AU-PS 164 502), the tubular section extending along the sleeve casing is made as one piece with the base, and is therefore also made of metal and is of comparatively minimal thickness. If high gas pressures, e.g., 4000 to 5000 bar, are produced when the propellant charge in the combustion chamber is detonated, a plastic, i.e., a permanent, deformation of the thin-walled tubular section occurs, especially since the sleeve casing is made from a synthetic plastic material which does not afford any appreciable reinforcement. Such a plastic deformation in the metal piece, however, creates the danger that the cartridge case will jam in the cartridge chamber after firing and can then be removed only with difficulty, generally requiring specialized tools.

A cartridge case (AT-PS 350 942) consisting of an outer sleeve casing made from a plastic material, a base piece, also preferably made from a plastic material, located therein, and an intermediate part firmly connecting the base piece to the sleeve into one unit is also known. The intermediate part surrounds the two front ends of the base piece and can therefore be made only by an injection molding process from an injection molding material. This cartridge case also is suitable only for comparatively low gas pressures, the special design being intended to make it possible to re-use the cartridge case.

Compared to this, it is the object of the instant invention to improve the cartridge case described initially by simple means so that it is able to withstand high gas pressures while reducing any possibilities of jamming.

SUMMARY OF THE INVENTION

This object is attained through a cartridge case of the instant invention comprising a metal base piece, a plastic sleeve casing, and a plastic tubular section made as a separate part extending along the inner surface of the sleeve casing. The tubular section includes a flange in intimate contact with an inner face of the metal base. Furthermore, the plastic sleeve casing includes a snap lock design which locks the sleeve casing to both the tubular section and the base piece.

Since the tubular section constitutes a separate part, it can therefore be made from a plastic material even though the base piece is made from metal. The tubular section thus resists the backwardly-directed gas pressure. The required sealing of the combustion chamber to the base piece and radially outwardly is achieved on the one hand, while on the other hand a permanent deformation of the metal base piece due to the high gas pressure is also prevented so that there is no difficulty in withdrawing the cartridge case from the cartridge chamber. The plastic tubular section and the plastic sleeve casing are subjected to elastic deformations so that although close contact against the inner wall of the cartridge chamber is ensured during firing, no jamming need be feared.

The assembly of the cartridge case is also simplified since it suffices to set the tubular section with its flange on the base piece and then to slide the sleeve casing over it, the snap lock design simultaneously locking together the three parts.

If the cartridge case is of a type which includes a flash tube extending into the combustion chamber from the base piece, then it is desirable that the tubular section also include a sealing lip extending from the flange and pressing against the flash tube. The sealing lip effectively prevents combustion gases from penetrating between the flange of the tubular section and the inner face of the base piece. In the absence of a flash tube, it is recommended for the same reason that the flange be provided with a collar or similar device extending into a groove or thread, etc., of the base piece.

BRIEF DESCRIPTION OF THE DRAWING

The drawing shows the elements of a cartridge case according to the instant invention in partial section.

DETAILED DESCRIPTION OF A PREFERRED EMBODIMENT

Figure 1:
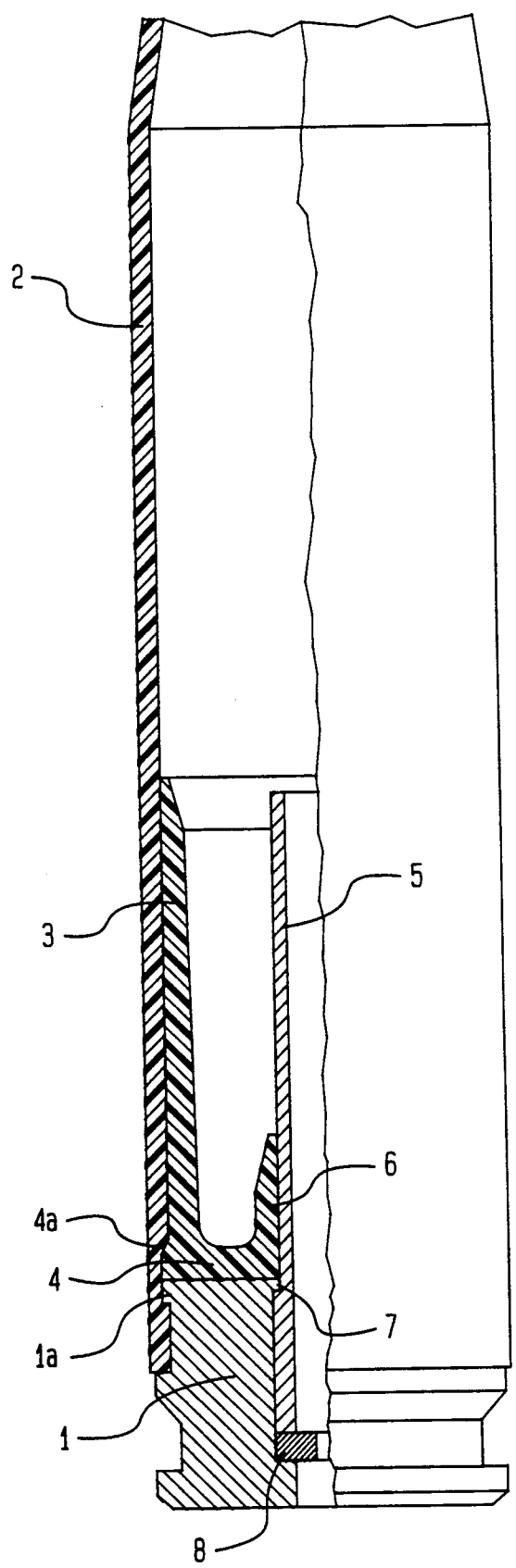

Referring to the drawing, a cartridge case comprises a base piece 1 made from metal and a sleeve casing 2 made from a plastic material which snaps over a ring projection 1a of the base piece through elastic deformation when it is slid on. A tubular section 3, also made from a plastic material, extends from the base piece 1 along the inside surface of sleeve casing 2 into the combustion chamber. The tubular section 3 has a flange 4 in intimate contact with the inner face of the bottom piece 1. The tubular section 3 also includes a ramp 4a along its outer surface in contact with sleeve casing 2. The sleeve casing 2 is expanded by means of the conical ramp surface 4a as it is slid over tubular section 3 so that it snaps over the ring projection 1a and connects the tubular section 3 to the bottom piece 1 in the manner of a snap lock.

An inwardly directed flash tube 5 is mounted on base piece 1. The flange 4 and the tubular section 3 adhere tightly to flash tube 5 by means of a ring lip 6 so that the escape of combustion gases either to the back or radially outwardly is effectively prevented.

The flash tube 5 is further provided with a small outer shoulder 7 so that said flash tube can be jam or press fitted into the base piece 1 upon being inserted into same, in that the material of the bottom piece is deformed over shoulder 7. The flash tube 5 rests on the bottom on a ring 8 which replaces an inner shoulder of the base piece 1 for reasons of manufacturing simplification.

While the invention has been described by reference to specific embodiments, this was for purposes of illustration only. Numerous alternative embodiments within the scope of the invention will be apparent to those skilled in the art.

I claim:
1. A cartridge case, comprising
   a base piece made from a metal, said base piece having an inner face,
   a sleeve casing mounted on said base piece, said sleeve casing being made from a plastic material, said sleeve casing having an inner surface,
   a non-integral tubular section disposed along the inner surface of said sleeve casing, sadi tubular section being made from a plastic material, said tubular section including a flange which extends along said inner face of said base piece, snap lock means disposed on said base piece, said sleeve casing, and said tubular section for connecting said base piece, said sleeve casing and said tubular section together, and a flash tube mounted on said base piece, said tubular section further including a lip extending from said flange along an outer side surface of the flash tube.

2. The cartridge case of claim 1 wherein said snap lock means includes a ramp disposed on an outer surface of said tubular section.

3. The cartridge case of claim 2 wherein said snap lock means includes a ring projection disposed on said base piece.

* * * * *